Oct. 14, 1958     H. J. BARRE     2,855,697
SUPPLEMENTAL HEAT MEANS FOR AIR DRYING CROPS
Filed May 9, 1957
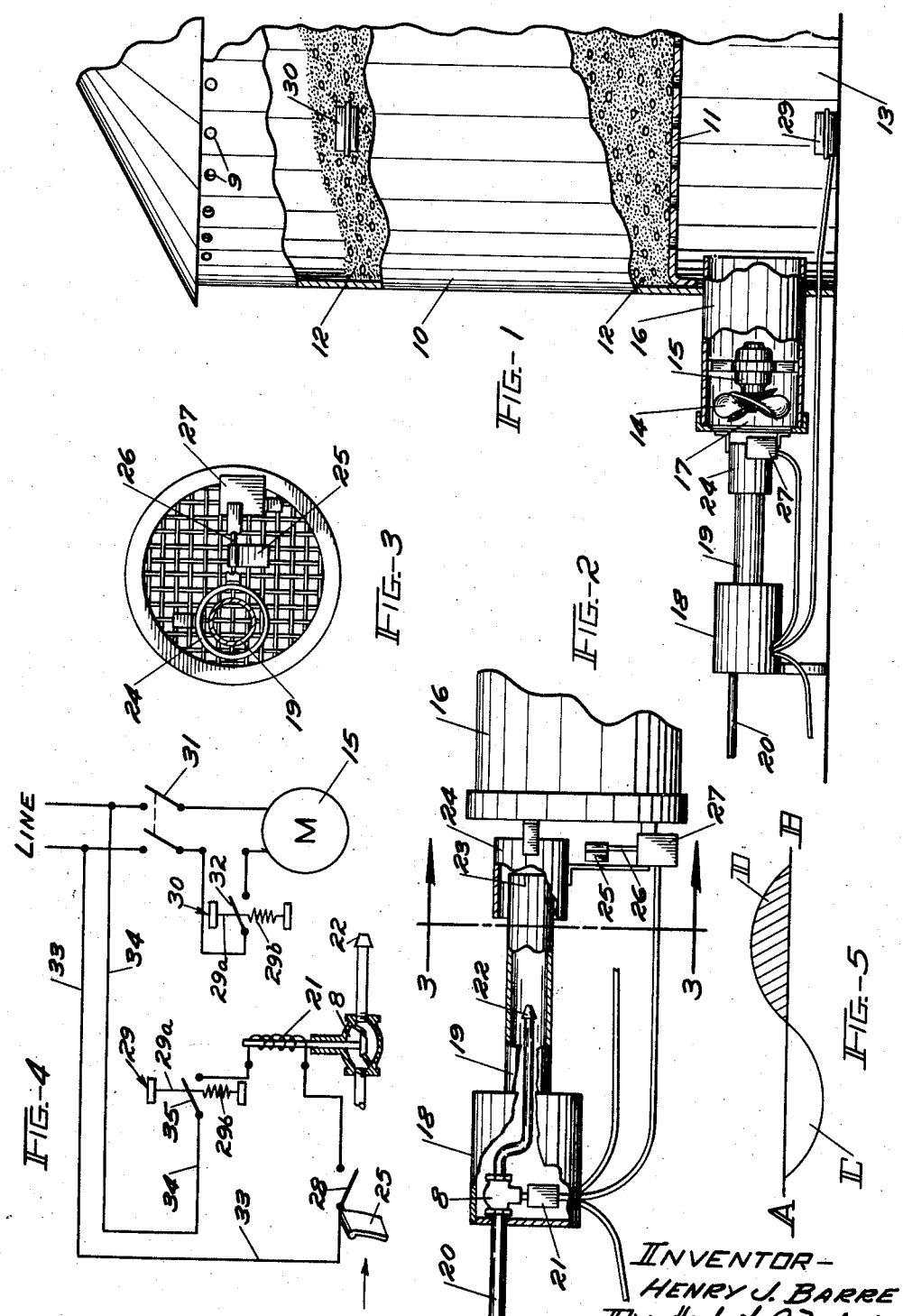

United States Patent Office 2,855,697
Patented Oct. 14, 1958

2,855,697

SUPPLEMENTAL HEAT MEANS FOR AIR DRYING CROPS

Henry J. Barre, Mansfield, Ohio

Application May 9, 1957, Serial No. 658,128

4 Claims. (Cl. 34—46)

This invention relates to a device for drying crops in storage such as the various grains and hays wherein the crops are put in their final storage bins or spaces; a constant flow of atmospheric air is carried through the crops; and the relative humidity of that air traveling through the crops is automatically controlled to an approximate constant level in spite of varying atmospheric changes in the relative humidity, all to the end that the crops may be dried in a minimum amount of time to avoid losses such as souring, mold growths, rotting, and the like, and on the other hand without in any manner destroying the germinating or other qualities of the grain particularly in too quickly drying or in over-drying the grains in any zone in the storage space.

It has been a practice for some time to force atmospheric air through bins or haymows in order to reduce the moisture content of crops stored therein.

The farmer finds himself confronted with two problems in harvesting his crops, one being that of likelihood of damage from weather if he leaves the crops in the field for drying a sufficient length of time for a proper low moisture content, and the other situation is that in order to get the crop in before severe storm damage, or in using modern machinery particularly combines and corn pickers, which work more satisfactorily in respect to the saving of grain when the grain carries a high moisture content, he harvests and then runs the risk of spoilage of that grain in the bin due to that high moisture content.

As indicated, heretofore air has been forced through the grains particularly as well as the hay, in order to reduce the moisture content. However there are times when this air being forced through the crops carries a very high relative humidity particularly at night, and in humid days, especially in the fall months of September, October, November, so that more days for drying are required.

An important consideration in drying all kinds of crops, including hay, is the maximum time permissible to complete the drying. The longer the drying time permitted, the more economical is the process of drying since both the equipment and operating costs of it are less. The maximum permissible time for the drying varies considerably with the temperature and humidity of the drying air, being much shorter when both the temperature and the humidity are correlated. This is particularly true for high moisture content of corn over twenty-five percent moisture. A grain moisture content less than twenty-five percent permits a longer drying period. Perhaps the most important single factor which determines the available time to dry the crops is the wet bulb temperature because it is the temperature to which the undried grain is subjected while air is being forced through the bin before the grain is completely dried. The grain temperature determines the rate at which grain deteriorates. In the case of mold development, the grain temperature determines the rate at which various fungi grow.

To dry grain rapidly or to increase the drying capacity, the wet bulb depression can be increased by heating the air being forced into the grain and through it or by increasing the air flow per bushel of the grain. An increase in air flow becomes impractical at the higher moisture levels of the grain such as shelled corn carrying twenty-five percent moisture and under unfavorable atmospheric conditions because of substantially larger power requirements. That is, more air would have to be forced through the grain and that means that a larger size fan together with a higher power input is required. Thus to keep down the cost of the air flow equipment, a somewhat higher temperature is desirable. However, in view of past experiences, to apply heat intermittently particularly under manual control, there has been quite a bit of overdrying of the grain particularly in the lower zone of the grain in the bin at the entrance thereto of the incoming air. The added heat of course influences the relative humidity.

Therefore for satisfactory performance to get the crop in storage dried as quickly as possible and to inhibit mold growth accordingly as well as other deterioration and still leave the crop in good condition the humidity of the drying air should be held at a fairly constant level for the most satisfactory performance.

In order to achieve the substantially constant humidity level, supplemental heat for drying-in-storage seems to present the greatest possibility in conditioning high-moisture content crops, particularly on the farm. This supplemental heat eliminates the uncertainty of unfavorable weather which occurs too frequently and which does not permit complete and rapid enough drying. The added operating costs for fuel to supply the supplemental heat is largely offset by the lower power cost of operating the fan.

The present invention is to be distinguished from the heretofore known method of "batch" drying, wherein batches of the grain or hay are dried rapidly and then placed in storage afterwards. Also the present invention eliminates the common hazard of the batch operation or of manually controlling the supply of heat of overdrying the lower zone while trying to dry the top zone of the crop in the storage space.

The present invention involves the automatic addition of heat so as to effect a continuous drying action even though there be a rising relative humidity of the atmospheric air which otherwise would decrease considerably the rate of natural air fan drying. The invention permits the drying operation to be carried on continuously without having any stops or delays due to adverse weather conditions, and the drying operation is continued until the crop moisture content has been reduced to the safe limit in storage.

It is known that to add heat to a current of air employed to dry grain in cold weather to decrease the drying time and to bring the moisture content down to the desired level, a somewhat wider range of fluctuation in the humidity of the air being forced into the grain may be permitted, but during the summer when the air contains adequate heat, too much use of supplemental heat to the air flow can increase dangerous spoilage by raising the temperature of the undried grain to a level at which mold and spoilage will occur more rapidly. This simply means that a very close control of the humidity in the air flow is required, and that this control should be automatic in order to prevent wide fluctuations of the humidity variation in the supply of the drying air over the period required for drying.

The present invention contemplates operating the fan which is employed to produce the flow of air through the grain for twenty-four hours a day continuously until the drying has been completed.

With the foregoing in mind, reference is made to the accompanying drawing illustrating the invention more or less diagrammatically, in which drawing Fig. 1 is a view in vertical elevation and partial section of a typical installation of the invention as applied to a grain bin;

Fig. 2 is a view on an enlarged scale in top plan and partial section of the burner unit;

Fig. 3 is a vertical transverse section on the line 3—3 in Fig. 2;

Fig. 4 is a wiring diagram of the electric control system; and

Fig. 5 is a chart indicating periods of supplemental heat requirement.

A bin 10 having an upper air vent holes 9 is employed in which there is a perforated floor 11, above which floor the grain 12 is carried. The side wall of the bin 10 should be imperforate at least to the top level of the grain contained therein. The perforated floor 11 is spaced upwardly sufficiently to leave a chamber 13 thereunder which may be termed a plenum chamber.

An air mover or fan 14 is employed to set up a flow of air into the plenum chamber 13 to be forced upwardly through the perforations of the floor 11 to travel through the grain. The upward travel is essential as opposed to a down travel. The fan 14 with its driving motor 15 is suitably mounted within a housing 16 herein shown as cylindrical in cross-section, and this housing 16 enters the plenum chamber 13 from a side so that air set in motion by the fan 14 is forced into the chamber 13 from an open end 17 of the housing 16.

A burner generally designated by the numeral 18 is mounted to be outside of but adjacent to the housing 16, to have a housing 19 directed toward the opening 17 offset to one side of the axial center of the housing 16. This burner 18 operates upon gas, the ordinary L. P. gas being satisfactory and most convenient. The flow of gas from the entry pipe 20 is controlled through a valve 8, in turn operated by means of an electric solenoid 21, all of the usual and well known construction. The valve 8 controls the flow of gas from the entry pipe 20 to the burner nozzle 22 which is axially disposed in the tubular housing 19 spaced inwardly from the discharge end 23. Normally an ignition device such as a spark gap or a pilot burner (not shown) will be adjacent the end of the nozzle 22 to ignite the flow of gas therefrom. In the present form of the burner, the end 23 is positioned within a surrounding cylindrical shell 24 which is carried up closely to the open end of the fan housing 16. As indicated, the burner housing 19 and its end surrounding shell 24 are centered on a common axis, having that axis between the axis of the housing 16 and the wall thereof. To one side of the member 24 and removed therefrom and adjacent to the opening 17 of the housing 16, there is mounted a blade or sail 25 on a shaft 26 which enters a switch box 27. When the sail 25 is hanging downwardly normally under the influence of gravity, a switch 28 in the box 27 is open.

A humidistat 29 is positioned in the plenum chamber 13 to reflect the relative humidity in that chamber as may be varied by the humidity of the air flowing into that chamber under the operation of the fan 14. A like humidistat 30 is placed in the upper zone of the grain 12 in the bin 10.

The humidistat 29 is of that character which has a moisture sensitive element 29a characterized by lengthening when placed under tension when the moisture content of the air is raised and contracting when that moisture is reduced, and operates to close an electric circuit through a switch 35 by means of a spring 29b which also tensions the element 29a when the humidity in the plenum goes upward beyond a predetermined amount and then will open the switch by shortening of the element 29a when the humidity is lowered to that predetermined degree. The same construction and operation is had in the humidistat 30, through its switch 32 which reflects the relative humidity in the upper zone of the grain 12.

Referring to Fig. 4, the motor 15 is normally set into operation by a hand operated switch 31 bringing current from the line. The terminals of the switch 32 are interconnected in the one form herein shown through one side of the line between the switch 31 and the motor 15. Normally in starting the drying operation, the humidity in this upper zone of the grain 12 will be at that degree whereby the switch 32 is closed.

From the line, there leads a circuit through the wires 33 and 34 which includes in series the sail switch 28, the winding of the solenoid 21 and the switch 35 of the humidistat 29. When the motor 15 is energized, the sail or blade 25 will rock with the current of air induced by the fan to a substantially horizontally disposed position and thereby close the switch 28, and normally in the initial stages of the drying of the grain 12, the humidistat switch 35 will be closed, particularly at night and in the early morning hours. However this switch 35 will operate to open that circuit to the wires 33 and 34 and thereby deenergize the solenoid 21 allowing the valve 8 to close and stop the gas flow to the nozzle 22 to shut off heat to the air flow through the grain. Thus heat from the nozzle 22 will be obtained only when the higher degrees of humidity prevail in the plenum chamber 13 which is in the volume of air being forced upwardly through the grain 12.

The nozzle 22 forms a torch-like flame which is directed toward the opening 17, and being surrounded by the housing 19 and the protective end shield 24, the stream of heated air is carried to one side of the fan 14 where the heated air is mixed with the atmospheric air being pulled inwardly by the fan 14 to deliver a substantially uniformly heated column of air into the plenum chamber 13.

In the course of drying the grain 12, this grain will dry progressively from the bottom up in zones, so that in the beginning, the grain over the floor 11 will be drier than that at the top surrounding the humidistat 30. This progressive drying will require in most instances, particularly where the grain is shelled corn and having a twenty-five percent moisture content, up to seven to eleven days normally although this time may be increased depending upon the outside atmospheric conditions as to temperature primarily.

From time to time the upper zone of the grain may be sampled for moisture content to determine the rate of drying, and the motor 15 normally deenergized by opening the switch 31. However the most satisfactory operation is had by depending upon the upper humidistat 30 to sense the humidity degree in the upper zone, and when that humidity drops down to that point where the grain is dried in accordance with presetting of the humidistat, such as around twelve to thirteen percent, the switch 32 will open the motor circuit and thereby stop the entire operation not only of the fan 14 but also of the burner 22. In that manner, the entire process of drying becomes automatic without any attention of the operator other than to see that there is a supply of gas through the pipe 20. Of course if there is a failure in the electricity, the solenoid 21 will not open the gas line for gas flow, and if the pilot light goes out, that light is controlled by a valve (not shown) automatically cutting off gas flow as is known in the usual and well known construction of such pilot light structures. On the other hand, even though the motor 15 may not be operating, there will be no heat supplied since the sail 25 will reflect that condition and not close the switch 28 but leave it open.

Thus it is to be seen that I have provided a continuously operating system for drying grain wherein the system will automatically adjust itself in accordance with the atmospheric relative humidity so that there will be a predetermined humidity set up in the air flow entering the grain, and the complete drying out of the grain to the desired degree will be automatically obtained and the system deenergized without any possibility of overheating of the grain in the bin in its lower zone particularly.

This invention involves basically natural air drying of the crop. If the natural air (normal air outside of the crop container) condition is such that the available heat (not artificial) for drying the air is limited by atmospheric or weather conditions and in the absence of wet bulb depression, then the heater unit as above described automatically operates to change the relative humidity of the air passed through the crop to the desired relative humidity level.

Referring to Fig. 5, the line A B indicates a selected level of relative humidity of the air to be carried through the container, thus humidity being plus above and minus below. From A to B represents time. As long as the relative humidity is within the area C, the heater unit 18 does not operate and the air of the atmosphere is used for drying.

When the relative humidity of the air increases such as through the area D, then heater unit 18 automatically operates, drying the air and thus corrects the adverse natural air humidity condition.

For example, suppose that there is a bright sunny day; the temperature is 70 degrees F. and relative humidity is 40 percent both at noon.

Under those conditions the heater unit does not operate. But at night, as the air cools, the relative humidity usually increases, and when it goes above the predetermined level for which the humidistat 29 has been set, the heater unit 18 will automatically operate to heat the air and reduce the relative humidity to at least that predetermined level. The upper humidistat 30 will be responsive to the relative humidity in the air flow in the upper zone as previously described which is responsive to the moisture content of the crop or grain at the upper level whereas the humidistat 29 is responsive to the moisture content of the drying air entering the grain.

By this means it is possible to control the humidity at two or more levels, not necessarily the same throughout the entire drying period. For example, a good possibility is to employ a humidity level such as 30 percent relative through the first part of the drying period, and then increase that level to about 60 percent in the last part of the drying period. These levels are respectively below and above a level which would be selected and maintained such as possibly 50 percent throughout the entire drying period.

This has the evident advantage of decreasing the overall drying period. Although there is overdrying in the first period, the grain in the bottom zone which has been overdried will regain the moisture content in equilibrium with the higher humidity during the last part of the drying period.

In either event, the method herein described obviously employs the absolute minimum input of energy such as through the burner and the fan drive, since the normal, unheated air is employed at all times possible in the drying period, the heat being employed only to condition the air when necessary to maintain the desired relative humidity level.

Therefore I do not desire to be limited to the precise structure as has been described since it is obvious that variations may be had in that structure all without departing from the spirit of the invention, and still be within the scope of the appended claims.

I claim:

1. For drying crops in storage, the combination with a storage container vented to the atmosphere at an upper end, and a plenum chamber in the lower end above which the crop is carried, said chamber having air discharge openings into the bottom zone of the crop: of an air delivery duct entering said chamber; means forcing air through the duct into the chamber, a motor driving said means continuously during a period required to reduce the moisture content of the crop to a safe storage amount setting up a continuous air flow upwardly through the crop; burner means supplying heat to said air entering said chamber; a humidistat in said chamber responsive to changes of humidity of the air forced therein; said humidistat controlling said burner means for delivery of heat therefrom upon the humidity in said chamber exceeding a predetermined degree and non-delivery of heat upon the humidity dropping below that degree; and means responsive to said flow of air rendering said burner means inoperative upon stoppage of said motor; said air forcing means comprising a fan at the end of said duct removed outwardly from said chamber; said burner means having a discharge heat flow housing directed toward said duct end and to one side of the axis of said fan; and said motor stoppage means including a switch in circuit with said motor, and a blade at said duct end actuating said switch, shiftable to a closed switch condition under the influence of flow of air entering said duct.

2. The structure of claim 1 in which there is a second humidistat located in the uppermost zone of said crop and interconnected with said motor, said second humidistat operating to inactivate the motor upon the humidity in said uppermost zone dropping to a predetermined degree reflecting said safe storage moisture content of the crop.

3. The mechanism for drying crops comprising a container holding the crops; a plenum chamber under the container discharging therein; a motor; a fan driven by the motor; an air heating housing carrying the motor and fan and discharging into said chamber, said housing having an air entrtance outside of the chamber; a heater having a discharge tube externally of said chamber and directed toward said housing entrance to one side of that entrance; a sail blade rockably supported in the path of air flow as induced by said fan and to one side of said heater tube; an electric switch normally open and closed by the rocking of said blade under said air flow; a humidistat including an electric switch within said plenum chamber; a solenoid valve controlling heat flow from said burner and having an electric winding; and an electric circuit including in series said humidistat switch, said sail blade switch, and said electric winding, said heater being operated thereby only upon closing of said humidistat switch in accordance with a relative humidity above a predetermined minimum.

4. The structure of claim 3 in which there is a second circuit including said motor; and there is a second humidistat located in the upper portion of said container, said second humidistat having a switch normally closed and opening upon the lowering of the relative humidity to a predetermined degree, said second humidistat switch being in series with said motor in said second circuit, the stoppage of said motor by the opening of that switch causing the said blade switch to open under no air flow and maintain said first circuit in an open condition.

References Cited in the file of this patent

UNITED STATES PATENTS

| | | |
|---|---|---|
| 1,550,422 | Braemer | Aug. 18, 1925 |
| 2,027,268 | Davis | Jan. 7, 1936 |
| 2,050,254 | Barnsteiner | Aug. 11, 1936 |
| 2,403,630 | Blunk et al. | July 9, 1946 |
| 2,412,407 | Kilbury | Dec. 10, 1946 |
| 2,577,104 | Butler | Dec. 4, 1951 |
| 2,604,313 | Grantham | July 22, 1952 |
| 2,608,768 | Noel | Sept. 2, 1952 |
| 2,655,734 | Ohlheiser | Oct. 20, 1953 |